United States Patent [19]

Little

[11] Patent Number: 5,327,564
[45] Date of Patent: Jul. 5, 1994

[54] TIMED ACCESS SYSTEM FOR PROTECTING DATA IN A CENTRAL PROCESSING UNIT

[75] Inventor: Wendell L. Little, Carrollton, Tex.

[73] Assignee: Dallas Semiconductor Corporation, Dallas, Tex.

[21] Appl. No.: 714,973

[22] Filed: Jun. 13, 1991

Related U.S. Application Data

[63] Continuation of Ser. No. 163,980, Mar. 4, 1988, abandoned.

[51] Int. Cl.⁵ .............................................. G06F 13/14
[52] U.S. Cl. .................................... 395/725; 395/550; 395/425; 364/DIG. 1; 364/246.8; 364/251.4; 364/260.2
[58] Field of Search ... 364/200 MS File, 900 MS File; 395/725, 550, 425

[56] References Cited

U.S. PATENT DOCUMENTS

| 3,469,239 | 9/1969 | Richmond et al. | 364/200 |
| 4,570,217 | 2/1986 | Allen et al. | 364/900 |
| 4,740,890 | 4/1988 | William | 364/200 |

Primary Examiner—Lawrence E. Anderson
Attorney, Agent, or Firm—Worsham, Forsythe, Sampels & Wooldridge

[57] ABSTRACT

A system for protecting data in a CPU's internal register. To obtain write access to the protected register, a process must sequentially write first and second keywords to an access register, within a predetermined time window.

7 Claims, 2 Drawing Sheets

TIMED ACCESS SYSTEM FOR PROTECTING DATA IN A CENTRAL PROCESSING UNIT

This is a continuation of application Ser. No. 163,980, filed Mar. 4, 1988 now abandoned.

TECHNICAL FIELD OF THE INVENTION

The present invention pertains in general to microprocessor based systems, and more particularly, to a timed access system to protect internal registers.

BACKGROUND OF THE INVENTION

Microprocessor based systems operate in a normal mode by fetching instructions, executing the instructions and routing data between various registers and/or system ports. This occurs within the constraints of various timing cycles called machine cycles, with the flow of data and instructions tracked through the use of various data and program pointers, etc. Since instructions are executed in a sequential format, it is necessary for the central processing unit or microprocessor to know the status of the instruction that is being executed, or the data or instructions that are being transferred, etc. Whenever the system loses track of the program, it is possible to enter an undesirable program loop that the system cannot get out of, which can result in a catastrophic system failure. This sometimes is referred to as deadlocking the system.

Various techniques have been utilized to enable a user of the system to get out of a deadlocked mode such as the use of interrupts, watchdog timer circuits, etc. However, one disadvantage to losing track of where the CPU is in the execution sequence is the possibility of damaging certain internal data stored in internal registers. For example, if an instruction is misinterpreted as loading the contents of the internal data bus into an internal register, this could destroy the contents of the register. The contents of this register may be important to the overall system operation which may require the system to be completely reinitialized.

Therefore, there exists a need for a system that protects internal registers from execution errors. These execution errors may be due to timing factors or the general failure of the system program to properly execute.

SUMMARY OF THE INVENTION

The present application discloses a protection system for protecting internal data in a CPU. The system includes a protected internal register for storing data with access to the internal register provided by an enable signal received on an enable input. An access register is utilized for receiving and storing access data from the CPU. A comparator is provided for comparing the access data with a first predetermined access word. When a match is determined between the stored access data and the first predetermined access word, a first timer is initiated which has a first predetermined duration of time. During the first predetermined duration of time, the comparator compares the stored access data with a second predetermined access word. If a match occurs within the first duration of time, a second timer is initiated having a second duration of time. The enable signal is generated during the second predetermined duration of time to allow access to the internal register only during the second predetermined duration of time.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
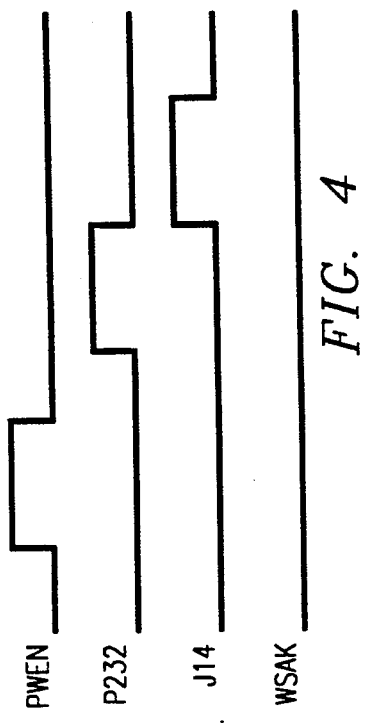
FIG. 1 illustrates a block diagram of the timed access register and the timed access control circuit incorporated into a CPU.

Referring now to FIG. 1, there is illustrated a block diagram of a central processing unit (CPU) 10 utilizing the timed access feature of the present invention. The CPU 10 is a conventional central processing unit having various internal circuitry such as ALUs, program counters, stack pointers, timing and control circuitry which are not illustrated but are well known in the art. For simplicity purposes, this is not illustrated. However, the CPU is described in co-pending U.S. patent application, Ser. No. 164,097, now U.S. Pat. No. 4,947,477 filed concurrent herewith and entitled Partitionable Embedded Program and Data Memory for a Central Processing Unit, which is incorporated herein by reference. The portion of the CPU 10 that is illustrated is an internal data bus 12 that is operable to carry data between the various circuitry in the CPU. A protected internal register 14 is connected to the internal data bus and is operable to have data loaded therein and output data therefrom. The protected register 14 normally contains data that is essential to the operation of the system and, as such, it is desirable to significantly decrease the probability that data stored therein can be destroyed. As will be described hereinbelow, the protected register 14 can only be written to when receiving an enable signal on an enable input thereto.

A timed access register 16 is also connected to the internal data bus 12 for receiving data therefrom for loading. The timed access register 16 and the output thereof are connected to a timed access logic circuit 18, the timed access logic circuit 18 outputting an enable signal on a line 20 for input to the enable input of the protected register 14. As will be described in more detail hereinbelow, the timed access register 16 and the timed access logic circuit 18 are operable to interact with a sequence of program instructions that, when executed correctly within predetermined time constraints, allow an enable signal to be generated on the output thereof.

Generally, the timed access register 16 and timed access logic circuit 18 are operable to store a predetermined value therein, and test the existence of this value. If this value is loaded correctly, a second value is then loaded in the timed access register 16. The timed access logic circuit 18 monitors the loading of data into the timed access register 16 and also the time required to load this information. A specific sequence of instructions must be executed in a specific time in order for the enable signal to be generated on the line 20. This is required every time the protected register 14 is to be accessed. Therefore, a programmer must insert this particular sequence of steps into his program prior to executing a LOAD instruction for the protected register 14. If the sequence of instructions is not executed, access to the protected register 14 is denied. Further, these instructions must be executed in a predetermined amount of time or a predetermined number of machine cycles, in order to gain access. In this manner, the contents of the protected register 14 can be protected from inadvertent instructions which may occur during a system deadlock wherein the program is running in an undesired loop. If this is not done, other mechanisms which enable the program to exit an undesired loop may be too late to save the contents of a particular register. By protecting the register 14 with the system of the present invention, the probability of the occurrence of the execution of the particular sequence and the execution of that sequence in a predetermined time is very low, thus significantly increasing the probability that the contents of the register 14 are undamaged.

Figure 2:
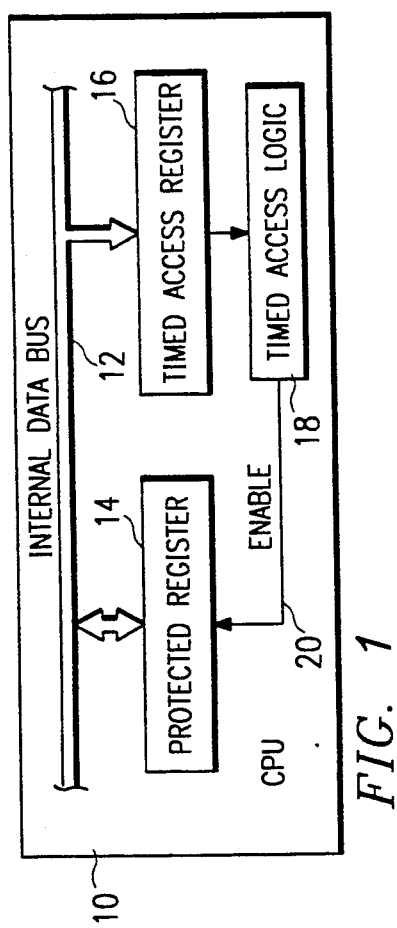
FIG. 2 illustrates a flow chart for the timed access sequence.

Referring now to FIG. 2, there is illustrated a flow chart depicting the timed access sequence of the present invention. However, it should be understood that this is only one example of the timed access system and other systems utilizing a predetermined sequence required to be executed distributed over a predetermined time can be utilized. The sequence is initiated at the beginning of a machine cycle 22 to load the Hex value of "AA". This requires a two cycle instruction, and therefore, will be completed at the end of the next machine cycle 24. However, the operation can be executed by loading the value "AA" utilizing one machine cycle which occurs during the machine cycle 24. Therefore, the first step in the timed access sequence is to load a predetermined value into the timed access register 16. This value is loaded into the timed access register 16 at the end of the machine cycle 24, indicated by a reference numeral 26.

The numeral 26 refers to a starting point for a timed access counter which is incorporated into the timed access logic circuit 18. At the starting point 26 during machine cycle 28, a first time A is initiated having a duration of time equal to Time A. A second predetermined value is then required to be loaded into the timed access register 16 during Time A. This can either be the Hex value of "55", which requires two machine cycles 28 and 30, or it can be a one cycle instruction to load the value "55" during machine cycle 28. Timed access logic circuit 18 determines if the value loaded was correct and if it was loaded prior to the end of Time A. If so, this is indicated as occurring within the two machine cycles 28 and 30. Therefore, the timed access logic circuit 18 requires the value of "55" to be loaded within "Time A".

At the end of the machine cycle 30, a second timer B is initiated, having a duration of "Time B". This occurs in two machine cycles 32 and 34 if loading of the Hex value of "55" requires two machine cycles. If the value of "55" was loaded into the timed access register 16 in one machine cycle, Time B has a duration of three machine cycles 30-34. At the beginning of Time B, the enable signal is generated. This occurs only if the value of "AA" was loaded prior to the end of Time A. The enable signal is generated only during "Time B" and, therefore, the protected register can only be loaded during "Time B". At the end of "Time B", as referenced by a reference numeral 36, the enable signal is removed and access to the protected register 14 is denied. Therefore, not only are two sequential values required to be loaded into the timed access register 16, but the values must be sequentially loaded in a predetermined amount of time followed by access to the protected register 14. If this sequence is not precisely carried out in the precise amount of time, access to protected register 14 will be denied.

Figure 3:
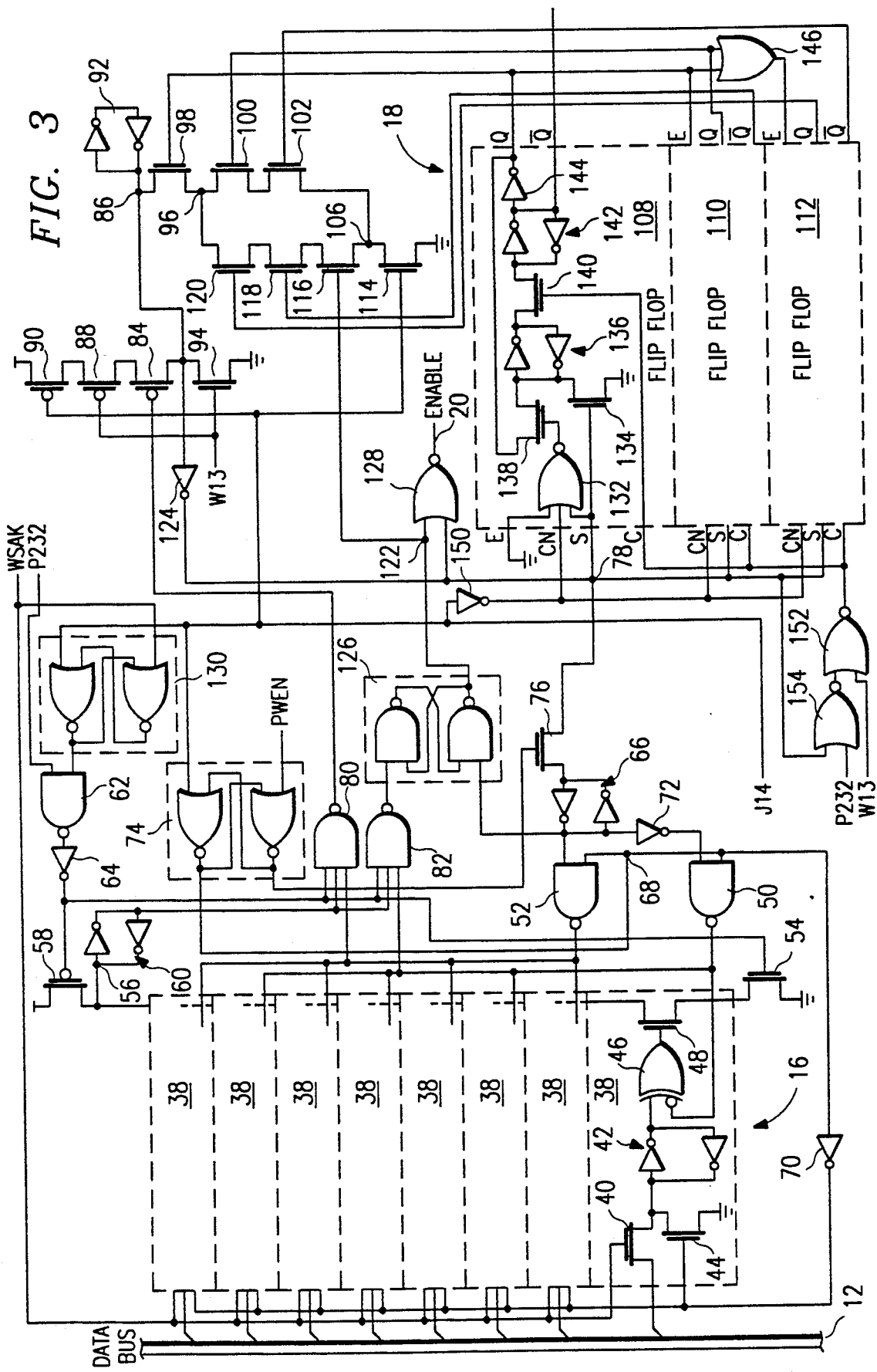
FIG. 3 illustrates a logic diagram of the timed access register and logic circuit.

Referring now to FIG. 3, there is illustrated a detailed logic diagram of the timed access register 16 and the timed access logic circuit 18. The timed access register is comprised of eight data registers 38, only one of which is shown in detail. Each of the data latches is comprised of an N-channel pass gate 40 which has a source-to-drain path connected with one end thereof to a data input connected to one data line of the data bus 12 and the other end thereof connected to the input of a latch 42, the latch 42 being configured with two back-to-back invertor circuits. The input to the latch 42 is connected to ground through the source/drain path of a N-channel transistor 44. The gate of N-channel transistor 40 is connected to the WSAK clock signal. The output of the latch 42 is connected to one input of an exclusive NOR gate 46, the output of which is connected to the gate of an N-channel transistor 48. The other input of the exclusive NOR gate 46 is connected to the output of either a NAND gate 50 or the output of a NAND gate 52.

All of the data registers 38 associated with even data bits D0, D2, D4 and D6 have the input of the exclusive NOR gate 46 connected to the output of the NAND gate 52, with the remaining registers having the input to the exclusive NOR gate 46 connected to the output of the NAND gate 50. The exclusive NOR gate 46 provides a comparator function wherein the contents of timed access register 16 provides a match output when stored value is "01010101" or a match when the value is "10101010". This represents the values "55" or "AA". By toggling the NAND gates 50 and 52, the two data words can be selected for a match output.

The N-channel transistors 48 are configured in an NAND function wherein all the source-to-drain paths of the transistors 48 in adjacent registers are connected in series with the D7 data register 38 having the source-to-drain path of the transistor 48 connected to ground through the source-to-drain path of an N-channel transistor 54. The source-to-drain path of the D0 register 38 is connected to a node 56 and also to the supply voltage through a P-channel transistor 58. The node 56 is connected to one side of a data latch 60 with the gate of P-channel transistor 58 and N-channel transistor 54 connected together and to the output of a NAND gate 62 through an invertor 64.

The NAND gate 52 has one input thereof connected to the output of a data latch 66 and the other input thereof connected to a node 68, node 68 being connected to one input of NAND gate 50 and also to the gates of the N-channel transistors 44 in each of the data registers 38 through an invertor 70. The other input of NAND gate 50 is connected to the output of latch 66 through an invertor 72. Node 68 is connected to the output of a Set/Reset (S/R) latch 74. One input of the S/R latch 74 is connected to a J14 clock signal and the other input is connected to a PWEN enable clock signal. The other output of S/R latch 74 is connected to the gate of an N-channel transistor 76, which has the source-to-drain path thereof connected between the other side of the latch 66 and a reference node 78.

The output of the NAND gate formed by the N-channel transistors 48 in the registers 38 is stored in latch 60. The output of latch 60 is connected to one input of a three input NAND gate 80 which is associated with the match for the first word loaded into the timed access register 16 and also to one input of a NAND gate 82, which is associated with determining if there is a match for the second word loaded into the timed access register 16. The NAND gate 80 has two additional inputs, one f which is connected to the output of invertor 64 and the other of which is connected to the output of NAND gate 52. NAND gate 52 selects for the first word when the output thereof is a logic high and NAND gate 50 selects for the second word when the output thereof is a logic high. The NAND gate 82 had two additional inputs, one of which is connected to the output of invertor 64 and the other of which is connected to the output of NAND gate 50.

The output of NAND gate 80 is connected to the gate of a P-channel transistor 84. The P-channel transistor 84 has the source-to-drain path thereof connected between a node 86 and a supply voltage through two series connected P-channel transistors 88 and 90. The gate of transistor 90 is connected to the clock J14 and the gate of transistor 88 is connected to a reset signal W13, which is normally low during loading of the timed access register 16. The logic level on node 86 is stored in a latch 92 and node 86 is also connected to ground through the source-to-drain path of an N-channel transistor 94, which has a gate thereof connected to the clock signal W13. Node 86 is also connected to a node 96 through an N-channel transistor 98, with node 96 connected through series connected N-channel transistors 100 and 102 to a node 106. The gate of transistor 98 is connected to the Q-output of a flip flop 108, the gate of transistor 100 is connected to the Q-output of a flip flop 110 and the gate of transistor 102 is connected to the Q-bar output of flip flop 112.

Node 106 is connected to ground through an N-channel transistor 114, the gate of which is connected to the clock J14. Node 106 is also connected to the node 96 through three series connected N-channel transistors 116, 118 and 120. The gate of transistor 120 is connected to the Q-output of flip flop 112, the gate of transistor 118 is connected to the Q-bar output of flip flop 110 and the gate of transistor 116 is connected to a node 122. Node 86 is connected to node 78 through an invertor 124. Therefore, the voltage on node 86 determines whether Word one has been received in the timed access register 16, Word one being the value of "AA".

The output of the NAND gate 82, associated with the Word two selection, is input to one input of an S/R latch 126, the other input of which is connected to the output of latch 66 on the input of NAND gate 52. The output of S/R latch 126 is connected to the node 122, node 122 being connected to one input of a NOR gate 128. NOR gate 128 provides the enable output on line 20. The other input of NOR gate 128 is connected to the output of invertor 124. Therefore, the enable signal is generated when both inputs to the NOR gate 128 are low.

The NAND gate 62 has one input thereof connected to a clock signal P232 and the other input thereof connected XO one output of an S/R latch 130. One input of S/R latch 130 is connected to the J14 clock and the other input thereof is connected to the WSAK clock.

The flip flops 108-112 each have an enable input, a set input, a clock input, and a clock input CN with a Q and a Q-bar output. Each of the flip flops 108-112 is comprised of a three input NOR gate 132, one input connected to the enable input, one input connected to the CN input and one input connected to the set input. The set input is also connected to the gate of an N-channel transistor 134 which has the source-to-drain path thereof connected between the input to a latch 136 and the other side thereof connected to ground. The output of NOR gate 132 is connected to the gate of an N-channel transistor 138, the source-to-drain path thereof connected between the input to latch 136 and the Q-output. The other side of the latch 136 is connected through the source-to-drain path of an N-channel transistor 140 to the input of a latch 142. The output of latch 142 comprises the Q-bar output which is connected to the input of an invertor 144 to provide the Q-output.

The enable input of the flip flop 108 is connected to ground and the Q-output thereof is connected to the enable input of the flip flop 110 and also to one input of an OR gate 146, the output of which is connected to the enable input of flip flop 112. The other input of OR gate 146 is connected to the Q-output of the flip flop 110. The CN inputs of flip flops 108-112 are each connected to the J14 clock through an invertor 150 with the input of invertor 150 connected to J14. The set inputs of flip flops 108-112 are connected to node 78. The clock inputs are each connected to the output of a NOR gate 152, one input of which is connected to the W13 clock and the other input of which is connected to the output of a NOR gate 154. NOR gate 154 has one input thereof connected to the output of invertor 124 and the other input thereof connected to the P232 clock.

Figure 4:
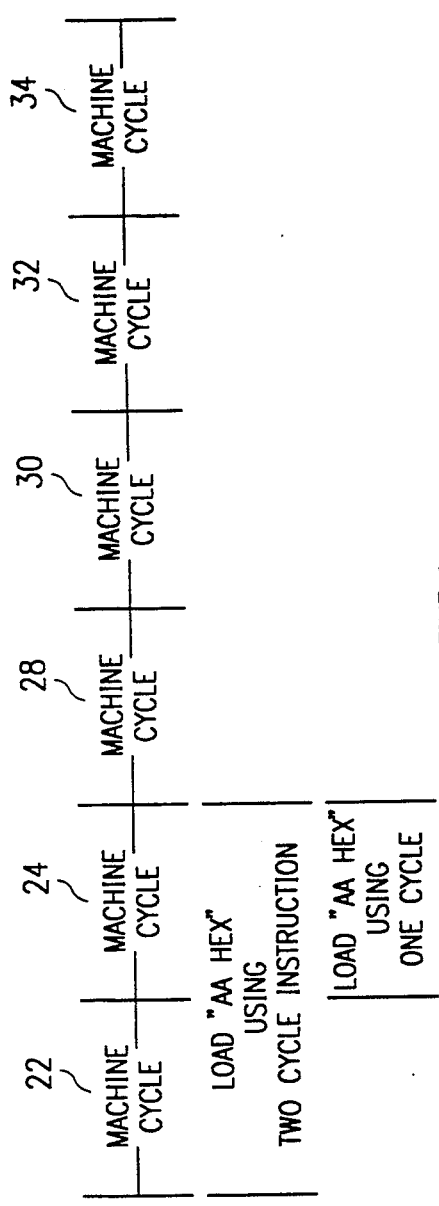
FIG. 4 illustrates a timing chart for clocks controlling the circuit of FIG. 3.
Figure 4:
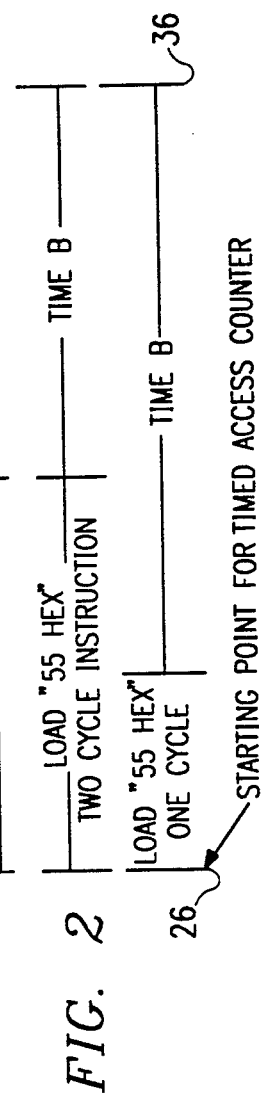

Referring now to FIG. 4, there is illustrated a timing diagram for clock signals P232, J14, PWEN and WSAK for one machine cycle. The signal W13 is not illustrated, since it is low after initially setting up the timed access register 16 and timed access logic circuit 18. The operation of the timed access register 16 and the timed access logic circuit 18 will be described in conjunction with the timing diagrams of FIG. 4. Initially, the S/R latch 74 has the output thereof set to a logic "0", thus raising the gates of the transistors 44 in each of the registers 38 to the logic high. This presets the latches 42 to a "0" value. This is a Clear function. At this time, the WSAK clock signal is low, opening the transistors 40. This occurs when J14 goes high and sets the node 68 to a logic low and the gate of transistor 76 low. When PWEN goes high, node 68 goes high and the gate of transistor 76 is pulled low, disconnecting the latch 66 from node 78. Node 78 is initially set high such that a logic high is input to latch 66 prior to PWEN going high. The output thereof is a logic low, thus placing a logic high on the output of the NAND gate 52. This is input to the data registers D0, D2, D4 and D6 such that the word "AA" is searched for.

When the word "AA" appears, the output of NAND gate 80 goes low. The loading of timed access register 16 occurs when WSAK goes high after PWEN goes high. When the output of NAND gate 80 goes low, this indicates a Word one match or the presence of the word "AA" in the register 16. This corresponds to the starting point 26 for the timed access counter. As described above, the timed access counter is comprised of three flip flops, 108, 110 and 112, which are configured as a ripple counter. Initially, they are turned off such that they do not count. When the output of NAND gate 80 goes low, this turns on P-channel transistor 84 and, since J14 and W13 are low, transistors 88 and 90 are turned on and node 86 is pulled high and stored in latch 92. The output of invertor 124 goes low which pulls the gates of the transistors 134 in flip flops 108-112 low and enables NOR gate 154 to pass the clock P232 to the clock impulse of flip flops 108-112, thus starting the timer. The timer will not be started until the word "AA" is loaded into the timed access register 16.

The logic low value on node 78 is then loaded into the latch 66 following the next J14 clock, resulting in a logic high on the output thereof. This results in a logic high on the output of NAND gate 50 and a logic low on the output of NAND gate 52 after the next PWEN signal. This selects for Word two which has a value of "55". When the value "55" is loaded into the timed access register 16 at the next WSAK clock, the output of NAND gate 82 goes low which pulls the output of S/R latch 126 low, since the output of latch 66 is also a high on the other input of the S/R latch 126. The logic low appears on node 122 which turns off transistor 116 prior to the occurrence of the J14 clock. If transistor 116 is not turned off prior to the occurrence of the J14 clock, the node 86 will be pulled low through transistor 98, transistor 120, transistor 118 and transistor 114. This low voltage will be reflected on the output of invertor 124 and on the set inputs of the timers, thus turning the timers off. This occurs if the word "55" is not loaded into the timed access register 16 within the two machine cycles 28 and 30, i.e., during Time A.

When the both inputs to the NOR gate 128 are low, the output thereof goes high, thus generating an enable signal on the output line 20. This enable signal will be maintained until either one of the inputs to NOR gate 128 go high. This occurs at the end of the count provided by the timer comprised of flip flops 108-112. This corresponds to the end of machine cycle 34 at point 36, i.e. at the end of Time B.

The timer comprised of flip flops 108-112 is operable at maximum count to force transistors 98, 100 and 102 to conduct such that when clock J14 occurs, transistor 114 conducts and grounds node 86. This puts a high on the input of NOR gate 128, thus changing the logic state on the enable line 20 to a low, changing the logic state on the enable line 120 to a low. Therefore, loading of "AA" into the timed access register 16 results in a logic high being stored in latch 92, thus setting one input of NOR gate 128 to a low. Consequently, loading of the word "55" into the timed access register 16 prior to the end of machine cycle 30 at the end of Time A sets the output of latch 126 to a logic low, thus raising the enable line 20 to a logic high. However, if the second word "55" is not loaded into latch 126 before the end of Time A, the timer comprised of flip flops 108-112 controls transistors 120 and 118 to conduct, thus causing node 86 to be discharged to a logic low if node 122 is at a logic high at the end of Time A, corresponding to the end of machine cycle 30.

To summarize the operation, it is first necessary to load the word "AA" into the timed access register 16 which starts the Timer A. At the end of Timer A, the circuit determines whether the word "55" was loaded into the timed access register. If so, the enable line 20 is pulled high, and if not, the enable line 20 is maintained low. When the enable line 20 goes high at the end of "Time A", it stays high until the end of Time B. This is the time during which the protected register 14 can be loaded.

In summary, there has been provided an access control for protecting a predetermined register within a CPU. The protected register can be loaded only if a predetermined sequence of instruction steps have been executed within a predetermined time. A timed access register is provided for containing a predetermined sequence of words, this predetermined sequence of words required to be loaded at predetermined times. Upon loading of a first predetermined word, a first timer is initiated, which timer has a predetermined duration. During the duration of the first timer, a second predetermined word must be loaded. If the second word is loaded, this initiates a second timer having a predetermined duration. During the predetermined duration of the second timer, an enable signal is output to enable loading of the protected register. The protected register can only be loaded during the predetermined duration of the second timer.

Although the preferred embodiment has been described in detail, it should be understood that various changes, substitutions and alterations can be made therein without departing from the spirit and scope of the invention as defined by the appended claims.

What is claimed is:

1. A protection system for protecting internal data in a CPU, comprising:

a protected internal register for storing the internal data without change except when accessed, said protected register having an enable input, and being configured to allow access thereto when an enable signal is received on said enable input;

access register means for receiving and storing access data;

compare means, connected to said access register means, for comparing said stored access data in said access register means with a predetermined access work and outputting a true compare signal if a match exists between said predetermined access word and said stored access data; and enable timing means, connected to said enable input of said protected register, for generating said enable signal for a predetermined amount of time when said true compare signal is detected on the output of said compare means such that said protected internal register is accessible only during said predetermined time after receipt of access data corresponding to said predetermined access word.

2. The protection system of claim 1, and further comprising:

intermediate timing means for generating an intermediate period of time if a match exists between said stored access data and said predetermined access word;

said compare means being connected to said intermediate timing means, and being operable to compare said stored access data with a predetermined intermediate access word and to start said intermediate timing means if a match exists between said predetermined intermediate access word and said stored access data; and said enable timing means being operable to generate said enable signal when said true compare signal output by said compare means is generated during the period of said intermediate timing means.

3. A circuit for protecting data in a register, comprising:

a protected register which is sought to be protected against accidental overwriting;

an access register, and a comparator connected to compare data stored in said access register with first or second predetermined access keywords and configured to output a compare signal accordingly;

timed access logic, connected to receive said compare signal from said comparator, and connected to control access to said protected register;

said protected register, said comparator, and said timed access logic being connected, together with at least one timing circuit, in a configuration such that said timed access logic allows access to said protected register only if said first predetermined keyword is written into said access register, AND thereafter said second predetermined keyword is written into said access register within a first predetermined maximum duration after said first predetermined keyword is written into said access register.

4. The circuit of claim 3, wherein:
whenever said timed access logic allows access to said protected register, said timed access logic allows access only for a second predetermined maximum duration after said first predetermined keyword is written into said access register.

5. The circuit of claim 3, wherein said protected register is an internal register of a microprocessor.

6. The circuit of claim 3, wherein said protected register and said access register are both internal registers of a microprocessor.

7. The circuit of claim 3, wherein said protected register and said access register is an internal register of a central processing unit (CPU).

* * * * *

UNITED STATES PATENT AND TRADEMARK OFFICE
CERTIFICATE OF CORRECTION

PATENT NO : 5,327,564
DATED : July 5, 1994
INVENTOR(S) : Wendell L. Little

It is certified that error appears in the above-identified patent and that said Letters Patent is hereby corrected as shown below:

Column 1, line 15      Replace "fetcning"
With --fetching--

Column 8, line 33      Replace "work"
With --word--

Signed and Sealed this

Twenty-sixth Day of September, 2000

*Attest:*

Q. TODD DICKINSON

*Attesting Officer*     *Director of Patents and Trademarks*